(12) United States Patent
Slippy et al.

(10) Patent No.: US 8,241,053 B2
(45) Date of Patent: Aug. 14, 2012

(54) ELECTRICAL CABLE WITH STRENGTH MEMBER

(75) Inventors: Gordon Slippy, Murrysville, PA (US); Paul Reynolds, Harmony, PA (US); Don Hines, Butler, PA (US)

(73) Assignee: Vocollect, Inc., Pittsburgh, PA (US)

( * ) Notice: Subject to any disclaimer, the term of this patent is extended or adjusted under 35 U.S.C. 154(b) by 176 days.

(21) Appl. No.: 12/726,477

(22) Filed: Mar. 18, 2010

(65) Prior Publication Data
US 2011/0056723 A1     Mar. 10, 2011

Related U.S. Application Data

(63) Continuation-in-part of application No. 12/557,011, filed on Sep. 10, 2009.

(51) Int. Cl.
*H01R 13/627* (2006.01)
(52) U.S. Cl. ........................................................ 439/353
(58) Field of Classification Search .................. 439/449, 439/578, 455, 464, 289, 322, 355, 376; 174/36, 174/102 SC, 106 SC, 74 R, 75 C; 29/857, 29/862
See application file for complete search history.

(56) References Cited

U.S. PATENT DOCUMENTS

| | | |
|---|---|---|
| 1,753,317 A | 4/1930 | Rothen |
| 2,170,287 A | 8/1939 | Kinnebrew |
| 2,369,860 A | 2/1945 | Schroeder |
| 2,741,194 A | 4/1956 | Dorey |
| 3,363,214 A | 1/1968 | Wright |
| 3,781,039 A | 12/1973 | Edwards et al. |
| 3,786,397 A | 1/1974 | Bridges |
| 3,808,577 A | 4/1974 | Mathauser |
| 3,964,771 A | 6/1976 | Baudouin |
| 4,068,913 A | 1/1978 | Stanger |
| 4,189,620 A * | 2/1980 | Stange ........................ 174/79 |
| 4,558,864 A | 12/1985 | Medwedeff |
| 4,595,251 A * | 6/1986 | Moulin ...................... 439/289 |
| 4,601,528 A | 7/1986 | Spier |
| 4,619,491 A | 10/1986 | Drogo |

(Continued)

FOREIGN PATENT DOCUMENTS

EP     DE4111049     10/1991

(Continued)

OTHER PUBLICATIONS

Vocollect, Wearable Computers Talkman &2x Wearable Computer, product brochure Sep. 2005 (4 pages).

(Continued)

*Primary Examiner* — Edwin A. Leon
(74) *Attorney, Agent, or Firm* — Wood, Herron & Evans, LLP

(57) ABSTRACT

A cord assembly for an electronic device includes a cord having an insulation layer with a first end and an exterior surface, as well as at least one electrical conductor extending within the insulation layer. A strength member also extends within the insulation layer and includes a first end extending beyond the first end of the insulation layer. A securing element couples the first end of the strength member with the first end of the insulation layer along the exterior surface. The strength member is pre-tensioned to carry any additional tensile loads on the cord, at least initially. The cord assembly may also include a strain relief member molded over the first end of the strength member and the securing element.

18 Claims, 6 Drawing Sheets

U.S. PATENT DOCUMENTS

| | | | |
|---|---|---|---|
| 4,620,760 A | 11/1986 | Duncan | |
| 4,649,332 A | 3/1987 | Bell | |
| 4,698,717 A | 10/1987 | Scheid | |
| 4,846,714 A | 7/1989 | Welsby | |
| 4,874,316 A | 10/1989 | Kamon et al. | |
| 5,024,604 A | 6/1991 | Savin | |
| 5,052,943 A | 10/1991 | Davis | |
| 5,186,647 A | 2/1993 | Denkmann et al. | |
| 5,187,645 A | 2/1993 | Spalding et al. | |
| 5,269,708 A | 12/1993 | DeYoung | |
| 5,299,956 A | 4/1994 | Brownell et al. | |
| 5,310,363 A | 5/1994 | Brownell et al. | |
| 5,326,284 A | 7/1994 | Bohbot | |
| 5,341,419 A | 8/1994 | Ferry | |
| 5,346,406 A | 9/1994 | Hoffman | |
| 5,362,257 A | 11/1994 | Neal et al. | |
| 5,371,679 A | 12/1994 | Abe et al. | |
| 5,393,239 A | 2/1995 | Ursich | |
| 5,399,102 A | 3/1995 | Devine | |
| 5,399,107 A | 3/1995 | Gentry | |
| 5,414,393 A | 5/1995 | Rose | |
| 5,432,484 A | 7/1995 | Klas | |
| 5,456,611 A | 10/1995 | Henry | |
| 5,462,452 A | 10/1995 | Devine | |
| 5,478,252 A | 12/1995 | Lecomte | |
| 5,480,313 A | 1/1996 | d'Alayer de Costemore d'Arc | |
| 5,501,571 A | 3/1996 | Van Durrett et al. | |
| 5,513,065 A | 4/1996 | Caveney et al. | |
| 5,517,683 A | 5/1996 | Collett | |
| 5,547,405 A | 8/1996 | Pinney | |
| 5,586,914 A | 12/1996 | Foster | |
| 5,599,209 A | 2/1997 | Belopolsky | |
| 5,618,185 A | 4/1997 | Aekins | |
| 5,639,256 A | 6/1997 | Endo et al. | |
| 5,647,770 A | 7/1997 | Belopolsky | |
| 5,657,459 A | 8/1997 | Yanagisawa et al. | |
| 5,665,485 A | 9/1997 | Kuwayama et al. | |
| 5,674,093 A | 10/1997 | Vaden | |
| 5,675,682 A | 10/1997 | De Marchi | |
| 5,687,478 A | 11/1997 | Belopolsky | |
| 5,697,817 A | 12/1997 | Bouchan et al. | |
| 5,759,070 A | 6/1998 | Belopolsky | |
| 5,779,503 A | 7/1998 | Tremblay et al. | |
| 5,803,750 A | 9/1998 | Purington et al. | |
| 5,864,089 A | 1/1999 | Rainal | |
| 5,911,602 A | 6/1999 | Vaden | |
| 5,913,702 A | 6/1999 | Garcin | |
| 5,931,703 A | 8/1999 | Aekins | |
| 5,934,911 A | 8/1999 | Stout et al. | |
| 5,938,479 A | 8/1999 | Paulson | |
| 5,941,726 A | 8/1999 | Koegel | |
| 5,941,729 A | 8/1999 | Sri-Jayantha | |
| 5,984,709 A | 11/1999 | Zink et al. | |
| 5,993,246 A | 11/1999 | Moldenhauer | |
| 6,022,237 A | 2/2000 | Esh | |
| 6,023,200 A | 2/2000 | Rhee | |
| 6,062,891 A | 5/2000 | Villiers | |
| 6,086,428 A | 7/2000 | Pharney et al. | |
| 6,089,923 A | 7/2000 | Phommachanh | |
| 6,120,329 A | 9/2000 | Steinman | |
| 6,149,451 A | 11/2000 | Weber | |
| 6,155,881 A | 12/2000 | Arnett et al. | |
| 6,186,834 B1 | 2/2001 | Arnett et al. | |
| 6,186,836 B1 | 2/2001 | Ezawa | |
| 6,213,808 B1 | 4/2001 | Whatmore | |
| 6,226,622 B1 | 5/2001 | Dabbiere | |
| 6,231,397 B1 | 5/2001 | de la Borbolla et al. | |
| 6,237,051 B1 | 5/2001 | Collins | |
| 6,280,256 B1 | 8/2001 | Belopolsky | |
| 6,290,529 B1 | 9/2001 | Tsurumaru et al. | |
| 6,290,546 B1 | 9/2001 | Pharney | |
| 6,304,436 B1 | 10/2001 | Branch et al. | |
| 6,310,888 B1 | 10/2001 | Hamlin | |
| 6,339,764 B1 | 1/2002 | Livesay et al. | |
| 6,346,010 B1 | 2/2002 | Emplit | |
| 6,361,354 B1 | 3/2002 | Viklund | |
| 6,364,675 B1 | 4/2002 | Brauer et al. | |
| 6,366,450 B1 | 4/2002 | Janicek | |
| 6,368,144 B2 | 4/2002 | Viklund | |
| 6,409,547 B1 | 6/2002 | Reede | |
| 6,443,777 B1 | 9/2002 | McCurdy et al. | |
| 6,454,608 B1 | 9/2002 | Kitahara et al. | |
| 6,476,318 B1 | 11/2002 | Lee | |
| 6,483,698 B1 | 11/2002 | Loh | |
| 6,523,241 B1 * | 2/2003 | Hubert et al. | 29/451 |
| 6,579,116 B2 | 6/2003 | Brennan et al. | |
| 6,597,577 B1 | 7/2003 | Tang et al. | |
| 6,786,743 B2 | 9/2004 | Huang | |
| 6,910,911 B2 | 6/2005 | Mellott et al. | |
| 6,910,922 B2 | 6/2005 | Haga | |
| 6,957,577 B1 | 10/2005 | Firmin | |
| 7,442,060 B2 | 10/2008 | Suwalski et al. | |
| 7,722,377 B2 | 5/2010 | Moore | |
| 2004/0083607 A1 * | 5/2004 | Campbell | 29/857 |
| 2005/0095899 A1 | 5/2005 | Mellott et al. | |
| 2011/0059642 A1 * | 3/2011 | Slippy et al. | 439/353 |

FOREIGN PATENT DOCUMENTS

WO      2011031710 A2      3/2011

OTHER PUBLICATIONS

Photographs of Vocollect Talkman T2x Wearable Computer (circa 2002)(2 pages).

* cited by examiner

ELECTRICAL CABLE WITH STRENGTH MEMBER

CROSS-REFERENCE TO RELATED APPLICATIONS

This application is a continuation-in-part of U.S. patent application Ser. No. 12/557,011, entitled BREAK-AWAY ELECTRICAL CONNECTOR, the disclosure of which is incorporated by reference in its entirety herein.

TECHNICAL FIELD

This invention relates generally to electrical cables and more specifically, to cords having use in various applications to attach one component to another.

BACKGROUND

Portable electronic devices such as mobile computer devices are used for a wide variety of tasks. When using a portable electronic device, a user may also use a headset or another peripheral device coupled to the portable electronic device. In one exemplary application, a mobile computer device is connected to a headset having a microphone and speakers. The user has mobility to perform computing and data-processing functions while moving about a worksite, such as a warehouse, for example. Through the headset, the users are able to receive voice instructions, ask questions, report the progress of their tasks, report working conditions, and provide and capture other data. The mobile computer device may also link the user to a centralized computer system or provide communications solutions for connecting different workers.

In addition to headsets, other peripheral devices are often coupled to the portable electronic devices depending upon the tasks to be performed. For example, bar code readers, RFID readers, and other scanners may be utilized alone or in combination with a headset to communicate back and forth in the system. The peripheral devices, such as headsets, are often attached to a portable electronic device with a cable or a cord. In the exemplary application, the cord extends generally from the computer (typically worn on a belt or at the waist area of a user) to the head of the user where the headset is located. With other peripheral devices, such as scanners or readers, the cord may extend from the portable computer at the waist to the hand of the user. As may be appreciated, the users are often moving rapidly around their work area or facility and are in some cases maybe jumping on and off of equipment, such as forklifts, pallet loaders, and other equipment. Therefore, there is always a possibility for a cord to get caught on some object. When this occurs, the cord will tend to want to separate either from the attachment point with the peripheral device or from the attachment point with the portable computer. Thus, it is important for the cord coupling the peripheral device and the portable electronic device to be strong enough to handle the forces encountered when a user snags the cord.

Attempts have been made to appropriately handle a snagged cord and cord separation from related connectors at one or both ends. One example of an attempt to balance and otherwise address these issues is provided in the connector of U.S. Pat. No. 6,910,911, which is owned by the assignee of the current application. While connectors have been designed to more easily release a cord at the portable electronic device, the strain placed on a cord over the course of multiple snags and disconnections can lead to failure of the cord. One current method for strengthening a cable is tying off ends of a strength member at the ends of a cord and then locking the ends in a pre-loaded position using adhesive and pre-mold members. While such a technique provides some protection to the cord, tying the ends also leads to inconsistent results for tensile pre-load. The cure time for an appropriate adhesive to hold the tied ends in position is generally over 20 minutes. Thus, it remains desirable to improve the strength of a cord efficiently and with consistent manufacturing results.

SUMMARY

The invention according to one embodiment provides a cord assembly for an electronic device. The cord assembly includes a cord, a strength member, a securing element, and a strain relief member. The cord has an insulation layer with a first end and an exterior surface, and at least one electrical conductor travels through the insulation layer. The strength member also extends within the insulation layer beside the electrical conductor. The strength member includes a first end which extends beyond the first end of the insulation layer. The securing element couples this first end of the strength member with the first end of the insulation layer along the exterior surface. Molded over the securing element and the first end of the strength member, the strain relief member is secured to the cord at the first end of the insulation layer. The strength member is loaded with a pre-tension force so that any further tensile loads placed on the cord by snagging or pulling of the cord are carried by the strength member at least initially.

In some embodiments, the strain relief member may include a connecting notch for mating with a housing of a peripheral device. The connecting notch divides the strain relief member into forward and rear portions, and the securing element may be a crimping member including a flange disposed within the forward portion. Thus, the flange would be disposed within the housing of the peripheral device to strengthen the connection between the peripheral device and the cord assembly. Alternatively, a connector including a connector housing and a pre-mold member may be positioned over the securing element and the strength member. The connector may include engagement members that couple to the electronic device and are configured to break away before a tensile load on the cord is carried by either the electrical conductor or the insulation layer.

In another embodiment, a method of strengthening a cord assembly is disclosed. The method includes applying a pre-tension force to a strength member extending through a cord at a first end of the strength member. A securing element is then crimped onto the first end of the strength member and the cord at an insulation layer. The crimping action maintains a tension pre-load on the strength member which permits the strength member to carry any additional tensile load placed on the cord at least initially. The pre-tension force may be applied by compressing a coil spring located between the insulation layer and the first end of the strength member.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

FIG. 4A is a cross-sectional side view of the connector and alternative embodiment of the first end of the cord of FIG. 3A.

DETAILED DESCRIPTION

Although the invention will be described herein in relation to certain embodiments, the invention is not limited to practice in any one specific type of portable electronic device or one specific type of peripheral device. It is contemplated that the principles of the invention can be used to connect a variety of electronic devices, including but not limited to wearable, portable and/or mobile computers, with a variety of peripheral devices, such as headsets and scanners. The description of the invention is intended to cover all alternatives, modifications, and equivalent arrangements as may be included within the spirit and scope of the invention as defined by the appended claims.

Figure 1:
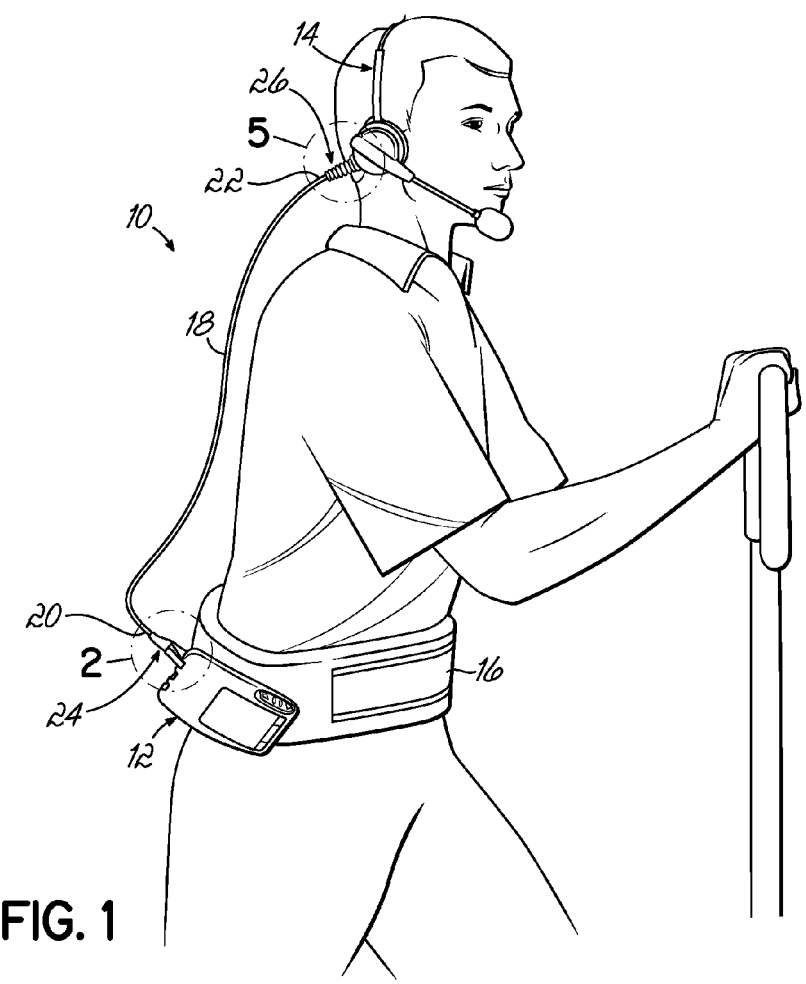
FIG. 1 is an illustration of a portable electronic device and peripheral device coupled with a cord according to one embodiment of the present invention.

Referring to FIG. 1, one embodiment of a cord assembly 10 according to the invention is illustrated. The cord assembly 10 is coupled to a portable electronic device 12 such as the wearable computer 12 shown and a peripheral device 14 such as the headset 14 shown. While described herein with regard to the wearable portable electronic device 12 and peripheral device 14, it will be appreciated that the cord assembly 10 is generally applicable to any type of electronic devices that need to be connected together by a wire or cord. In the embodiment illustrated, the portable computer 12 and the headset 14 permit a user to communicate with a central computer system and record or access information audibly through the headset 14. The portable computer 12 is typically worn on a belt 16, and the headset 14 is generally connected to the portable computer 12 with the cord assembly 10, which is long enough to extend between the belt 16 and a user's head.

In certain uses and environments, the cord assembly 10 connecting the portable computer 12 to the headset 14 may become snagged or entangled. A tensile force is then applied to the snagged cord assembly 10, which has a tendency to either damage the cord assembly 10 or pull the headset 14 from the user's head. Each of these results is highly undesirable. The solution to the snagging cord problem is two-fold: modifying the connector to the portable computer 12 so that it breaks away at a certain tensile load, and strengthening the cord assembly 10 to handle additional tensile loads prior to a connector breaking away from the portable computer 12. An improved method and structure for strengthening the cord assembly 10 is provided in the embodiment illustrated in FIGS. 1-7.

Figure 5:
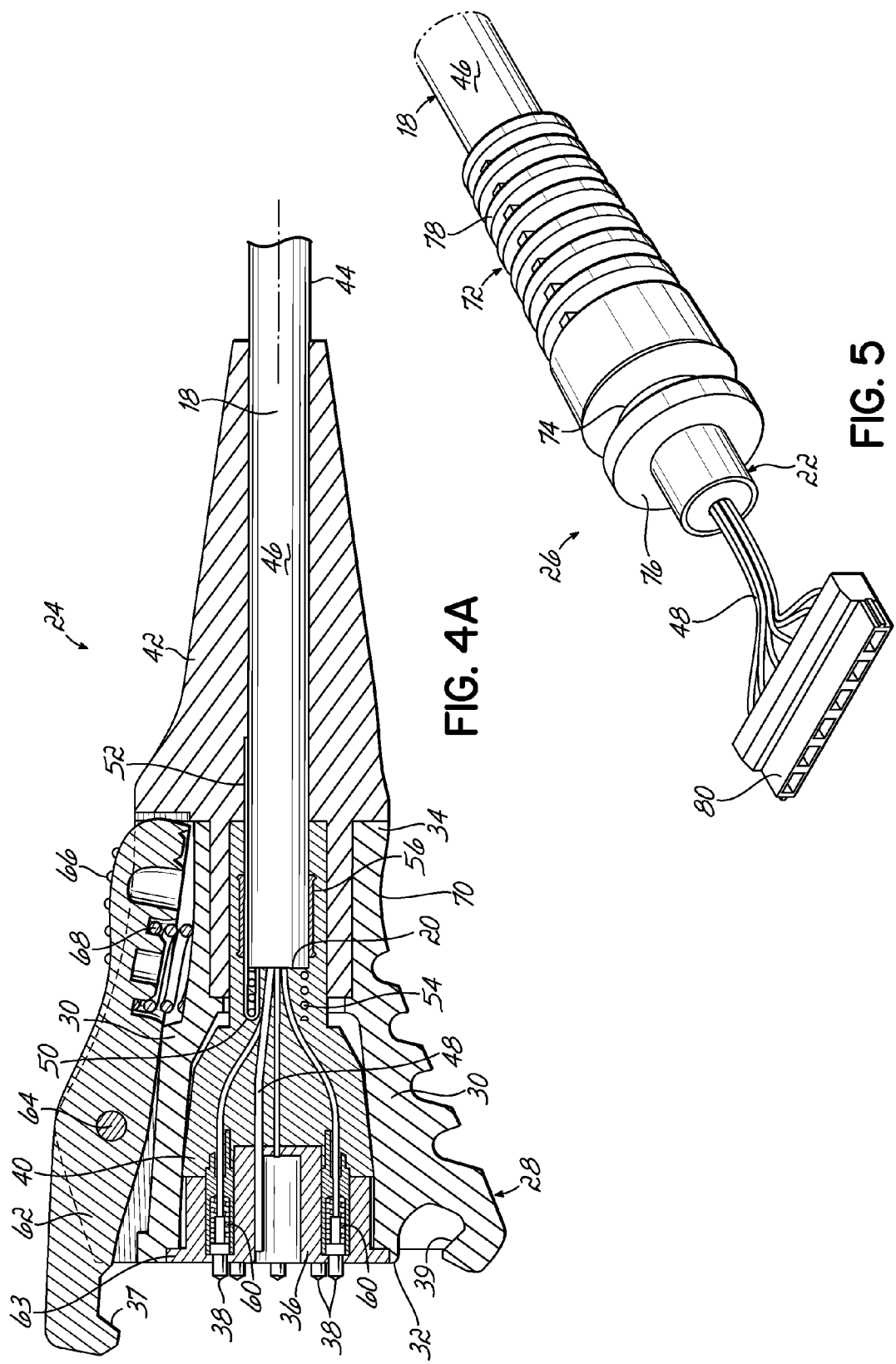
FIG. 5 is a perspective view of the encircled area 5 of FIG. 1, depicting a strain relief at a second end of the cord.
Figure 6:
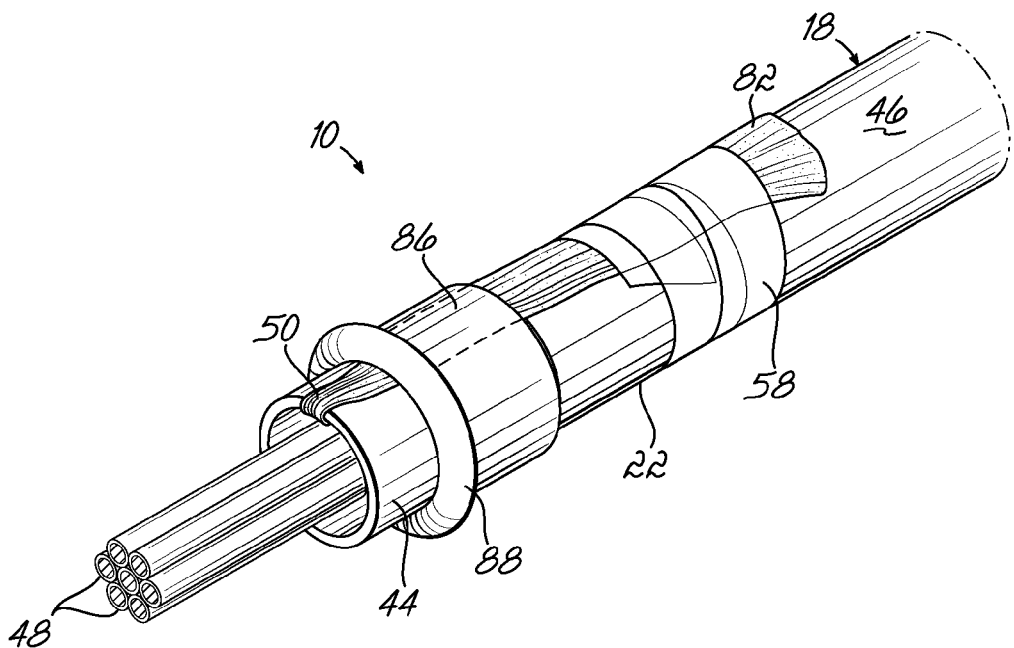
FIG. 6 is a perspective view of the second end of the cord of FIG. 5, with the strain relief molding removed.
Figure 7:
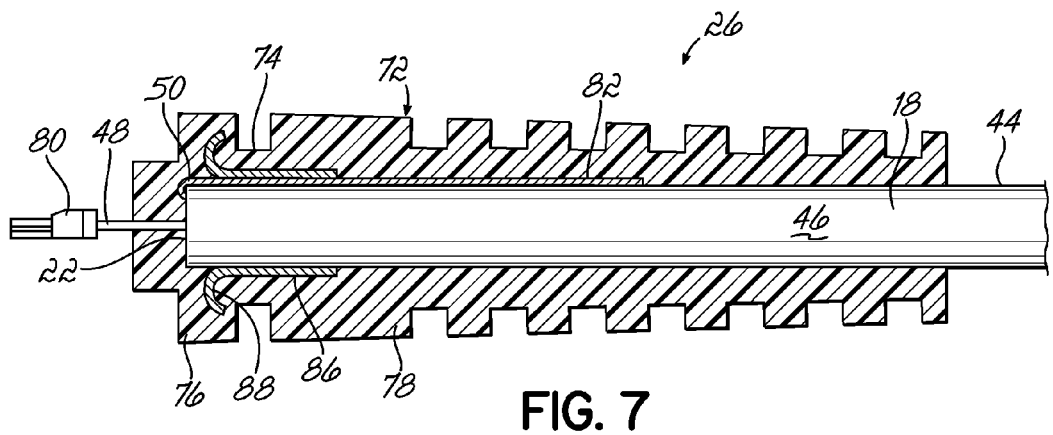
FIG. 7 is a cross-sectional side view of the strain relief and second end of the cord of FIG. 5.

As shown in FIG. 1, the cord assembly 10 includes a cord 18 having a first end 20 coupled to the portable computer 12 and a second end 22 coupled to the headset 14. The first end 20 is typically removably coupled to the portable computer 12, but the first end 20 may also be permanently coupled to the portable computer 12 in other embodiments. In contrast, the second end 22 is typically permanently coupled to the headset 14, but may alternatively be removably coupled in other embodiments. Thus, the cord assembly 10 may include different connectors on the first and second ends 20, 22 depending upon how the ends 20, 22 are to be coupled to the devices 12, 14. In the illustrated embodiment, a removable connecting assembly 24 is shown in FIGS. 2-4, while a more permanent connecting assembly 26 is shown in FIGS. 5-7.

Figure 2:
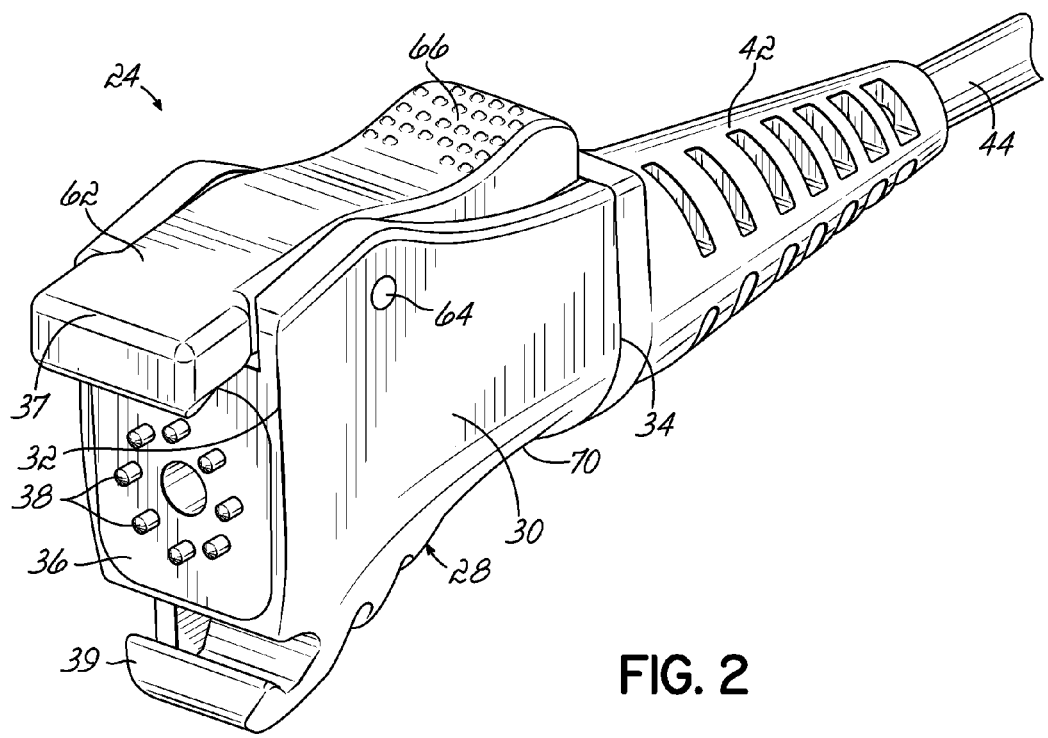
FIG. 2 is a perspective view of the encircled area 2 of FIG. 1, depicting a connector at a first end of the cord.

FIG. 2 illustrates the external features of the removable connecting assembly 24, which includes a plug member 28 coupled to the first end 20 of the cord 18. The plug member 28 includes a plug housing 30 including a front end 32 and a rear end 34. At the front end 32 of the plug housing 30, the plug member 28 includes a contact plate 36 including a plurality of electrical contacts 38 such as pogo pin contacts 38. The front end 32 of the plug housing 30 also includes first and second engagement claws 37, 39 which are configured to secure the plug member 20 to a corresponding socket (not pictured) on the portable computer 12. The plug member 28 also includes a pre-mold member 40 and a strain relief member 42. The pre-mold member 40 is molded over the first end 20 of the cord 18 and the strain relief member 42 is molded between the plug housing 30 and the pre-mold member 40, as will be described in further detail below. The strain relief member 42 has a generally elongated conical profile to help prevent stress damages to the first end 20 of the cord 18 when the cord 18 is bent in any direction near the plug housing 30. The strain relief member 42 ensures that the plug member 28 remains coupled with the first end 20 of the cord 18.

Figure 3:
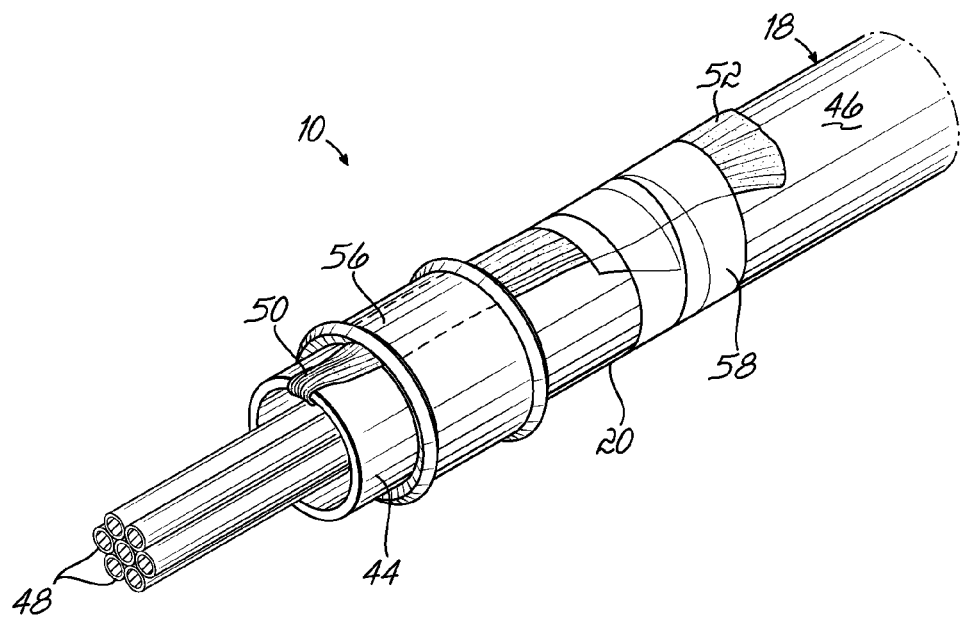
FIG. 3 is a perspective view of the first end of the cord of FIG. 2, with the connector body removed.
Figure 3A:
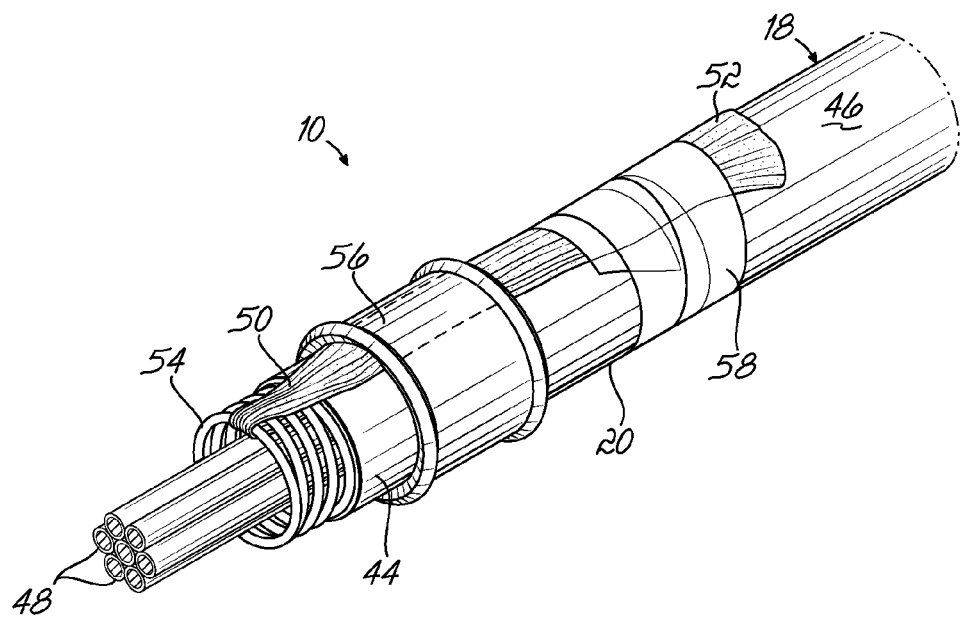
FIG. 3A is a perspective view of an alternative embodiment of the first end of the cord shown in FIG. 3, with the connector body removed.

FIG. 3 illustrates the cord assembly 10 at the first end 20 of the cord 18, prior to the addition of the removable connecting assembly 24 of FIG. 2. The cord 18 includes an insulation layer 44 defining the first end 20 and having an exterior surface 46. The insulation layer 44 may actually be one or more layers, and layer 44 is discussed as the outermost layer. Within the insulation layer 44, at least one electrical conductor 48 and a strength member 50 run throughout the length of the cord assembly 10. As shown in FIG. 3, the insulation layer 44 may be stripped at the first end 20 such that the conductors 48 and the strength member 50 extend beyond the first end 20. The strength member 50 is preferably formed from Kevlar material, but other materials configured to hold tensile loads may also be used in other embodiments. The strength member 50 includes a first end 52 that may be pulled back along the exterior surface 46 of the insulation layer 44 to tension the strength member 50. In the embodiment shown in FIG. 3, the cord assembly 10 also includes a securing element 56 locking the strength member 50 in the position shown after a pre-tension force has been applied to the strength member 50. The securing element 56 may again be a crimping member 56 in the form of a ring which may be tightly crimped onto the exterior surface 46 and the first end 52 of the strength member 50. If any portion of the first end 52 of the strength member 50 extends beyond the crimping member 56, that portion may be secured to the insulation layer 44 with tape 58 as illustrated In the alternative embodiment shown in FIG. 3A, the cord assembly 10 also includes a pre-tensioning element 54 for applying the pre-tension force before the securing element 56 locks the strength member 50 in the position shown. The pre-tensioning element 54 may be a coil spring 54 positioned against the insulation layer 44 at the first end 20. The securing element 56 may again be a crimping member 56 in the form of a ring which may be tightly crimped onto the exterior surface 46 and the first end 52 of the strength member 50.

Figure 4:
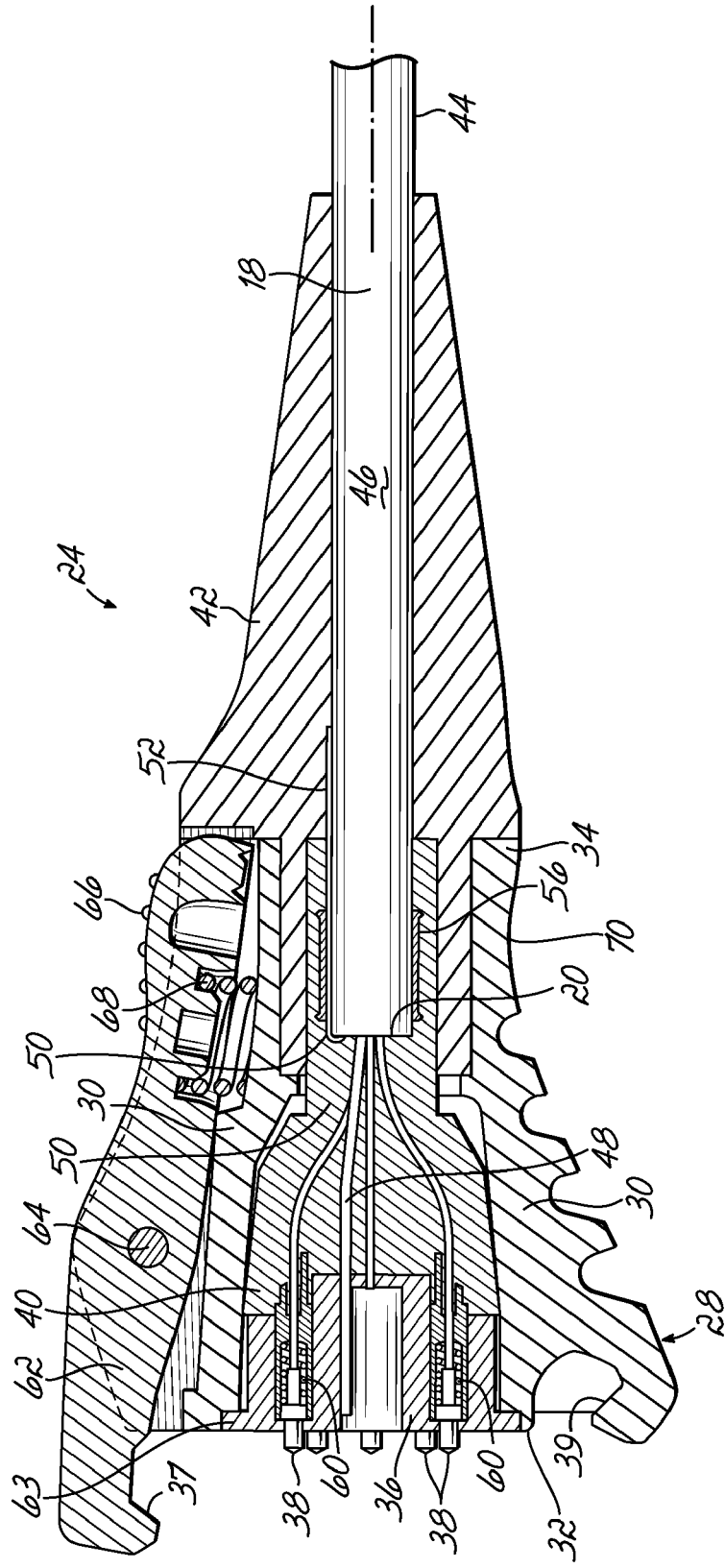
FIG. 4 is a cross-sectional side view of the connector and first end of the cord of FIG. 2.

Referring to FIGS. 3 and 4, the cord assembly 10 and removable connecting assembly 24 are assembled according to the following description. The first end 20 of the cord 18 is stripped of the insulation layer 44. The individual electrical conductors 48 may then be separated and soldered or otherwise electrically coupled to the electrical contacts 38 in the contact plate 36 of the plug member 28. The first end 52 of the strength member 50 is reversed and pulled back along the cord 18 to pre-tension the strength member 50. Once a proper amount of pre-tension has been applied to the strength member 50, the crimping member 56 is slid over the first end 20 of the cord 18 and is tightly crimped onto the first end 52 of the strength member 50 and the exterior surface 46 of the insulation layer 44. This secures the strength member 50 and ensures that the desired pre-tension force is applied to the strength member 50.

After the strength member 50 has been crimped into position, the pre-mold member 40 is molded over the first end 20 of the cord 18 to cover the strength member 50, the crimping member 56, and the exposed portions of the electrical conductors 48. The strain relief member 42 may then be molded onto the cord assembly 10 and the plug housing 30 may be positioned over the pre-mold member 40 and part of the strain relief member 42. As shown in FIG. 4, the pre-mold member 40 further ensures that the crimping member 56 maintains the desired pre-tension force in the strength member 50. The pre-tension maintained by the crimping member 56 on the strength member 50 allows the strength member 50 to be the first member within the cord 18 to experience tension forces when the cord 18 is stretched, pulled, or snagged on an external structure. Thus, the likelihood of damage to the individual electrical conductors 48 is reduced significantly. The cord assembly 10 and removable connecting assembly 24 are therefore assembled in an efficient and repeatable manner compared to conventional cord assemblies, which require inconsistent knot tying and long adhesive cure times.

Referring to FIG. 4, additional details of the plug member 28 are illustrated. As discussed above, the electrical contacts 38 in the contact plate 36 may be pogo pin contacts. In the illustrated embodiment, the pogo pin contacts are spring-biased outwardly by respective springs 60, which ensure a robust electrical contact between the plug member 28 and a socket on the portable computer 12. The plug housing 30 further includes a lever member 62 coupled to the plug housing 30 along an upper surface (in FIG. 4) at a pivot axle 64. The lever member 62 includes the first engagement claw 37 at the front end 32 of the plug housing 30 and a contoured finger grip surface 66 adjacent to the rear end 34 of the plug housing 30. The lever member 62 is biased by a lever spring 68 disposed between the lever member 62 and the plug housing 30 such that the first engagement claw 37 rotates downwardly with respect to the second engagement claw 39 formed in the plug housing 30. The plug housing 30 may further include a second grip surface 70 formed on an opposing side from the lever member 62, the grip surfaces 66, 70 allowing a user to easily grip the plug member 28 and push the lever member 62 against the bias of the lever spring 68.

The socket of the portable computer 12 is adapted to engage these first and second engagement claws 37, 39 in a locking manner when the lever member 62 is not depressed by a user gripping the plug member 28. However, the spring bias of the lever spring 68 is designed to allow the lever member 62 to rotate and release from the socket when a predetermined break-away force is applied to the cord assembly 10. Advantageously, this break-away force may be fully carried by the strength member 50 within the cord assembly 10 such that the plug member 28 will break away from the portable computer 12 before a snagging or tensile force is transferred to the electrical conductors 48 or the insulation layer 44 of the cord 18. For example, the cord 18 may be rated to fail at around 100 pounds of tensile force, and the break-away force may be set to be 10 pounds, or 10% of the rated failure load of the cord 18. Thus, the removable connecting assembly 24 further protects the cord assembly 10 from damage caused by catching or snagging of the cord 18.

Alternatively as shown in FIG. 4A, the first end 20 of the cord 18 may include the tensioning member 54. The tensioning member 54 or coil spring 54 is positioned to engage the insulation layer 44 at the first end 20 such that the electrical conductors 48 and the strength member 50 extend through the interior of the coil spring 54. The first end 52 of the strength member 50 is reversed and pulled back along the cord 18, partially compressing the coil spring 54 to tension the strength member 50. The crimping member 56 then secures the strength member 50 and ensures that the desired pre-tension force is maintained in the strength member 50. As shown in FIG. 4A, the pre-mold member 40 is molded over the strength member 50, crimping member 56, and coil spring 54 to further ensure that the crimping member 56 maintains the desired pre-tension force in the strength member 50.

FIG. 5 illustrates the external features of the more permanent connecting assembly 26, which couples the headset 14 (not shown in FIG. 5) to the second end 22 of the cord 18 in the illustrated embodiment. Similar to the removable connecting assembly 24, the connecting assembly 26 includes a second strain relief member 72 molded over the second end 22 of the cord 18. The second strain relief member 72 has a generally elongated conical profile to help prevent stress damages to the second end 22 of the cord 18 when the cord 18 is bent in any direction near the headset 14. The second strain relief member 72 includes a connecting notch 74 dividing the second strain relief member 72 into a forward portion 76 and a rear portion 78. The connecting notch 74 is configured to mate with a corresponding opening in the rigid housing of the headset 14 such that the forward portion 76 of the second strain relief member 72 is located within the headset 14. The second strain relief member 72 also covers the stripped end of the insulation layer 44 at the second end 22 of the cord 18 such that the electrical conductors 48 extend from the forward portion 76 of the second strain relief member 72. As shown in FIG. 5, the electrical conductors 48 extend to a shared pin connector 80 operable to electrically couple the cord assembly 10 to a control board within the housing of the headset 14. Alternatively, the electrical conductors 48 could be soldered or coupled with other types of connectors in other embodiments.

FIG. 6 illustrates the cord assembly 10 at the second end 22 of the cord 18, prior to the addition of the strain relief member 72 of FIG. 5. The second end 22 of the cord 18 includes a similar arrangement as the first end 20 as previously described. More specifically, the insulation layer 44 defines the second end 22 of the cord 18, and the strength member 50 and electrical conductors 48 extend beyond this second end 22. The strength member 50 includes a second end 82 that may be pulled back along the exterior surface 46 of the insulation layer 44. The cord assembly 10 also includes a second securing element 86 for applying a pre-tension force and locking the strength member 50 in the position shown in FIG. 6. The second securing element 86 may be a second crimping member 86 in the form of a ring which may be tightly crimped onto the exterior surface 46 and the second end 82 of the strength member 50. The second crimping member 86 also includes a radially-extending flange 88 that is not crimped tightly onto the exterior surface 46 at the second end 22 of the cord 18. Again, any portion of the second end 82 of the strength member 50 extending beyond the second crimping member 86 may be secured to the insulation layer 44 with tape 58.

Figure 6A:
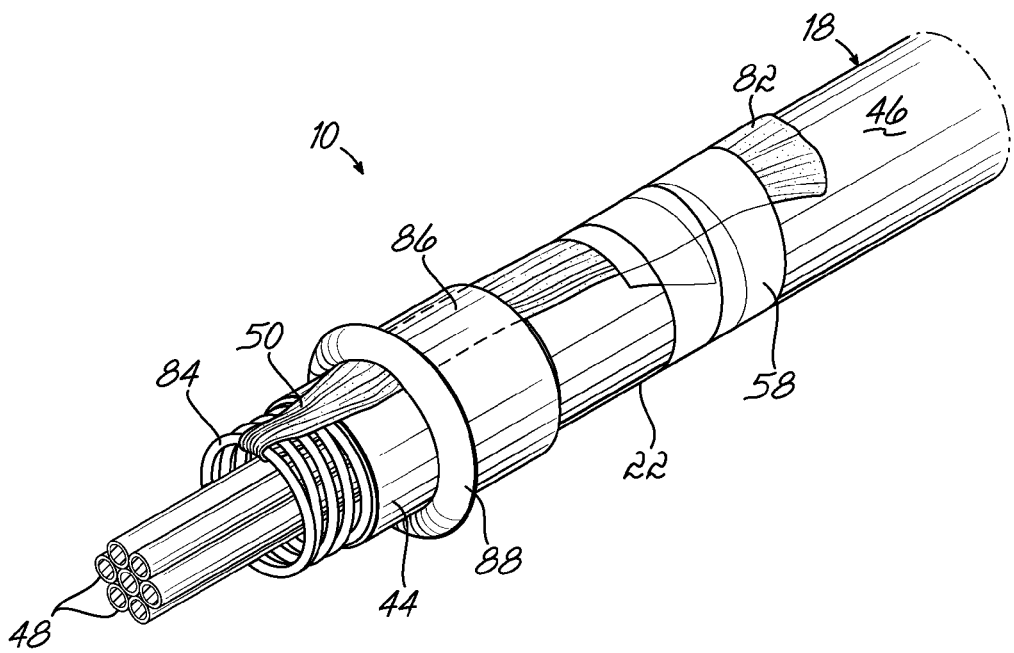
FIG. 6A is a perspective view of an alternative embodiment of the second end of the cord of FIG. 5, with the strain relief molding removed.

In the alternative embodiment shown in FIG. 6A, the cord assembly 10 also includes a second pre-tensioning element 84 for applying the pre-tension force before the second securing element 86 locks the strength member 50 in the position shown. The second pre-tensioning element 84 may be a second coil spring 84 positioned against the insulation layer 44 at the second end 22. The second securing element 86 may again be a second crimping member 86 in the form of a ring which may be tightly crimped onto the exterior surface 46 and the second end 82 of the strength member 50

Referring to FIGS. 6 and 7, the cord assembly 10 and connecting assembly 26 are assembled in a similar manner as previously described for the removable connecting assembly 24. The second end 22 of the cord 18 is stripped of the insulation layer 44, and the electrical conductors 48 are coupled to the shared pin connector 80, while the second end 82 of the strength member 50 is pulled back onto the exterior surface 46 of the insulation layer 44. After a certain amount of tensile pre-load is placed on the strength member 50, the second crimping member 86 is tightly crimped onto the second end 82 of the strength member 50 and the exterior surface 46 of the insulation layer 44. Finally, the second strain relief member 72 is molded over the second end 22 of the cord 18, the second crimping member 86, and the second end 82 of the strength member 50.

Like the first end 20 of the cord 18, the pre-tension maintained by the second crimping member 86 on the strength member 50 allows the strength member 50 to be the first member within the cord 18 to experience tension forces when the cord 18 is stretched, pulled, or snagged on an external structure. Thus, the likelihood of damage to the individual electrical conductors 48 is reduced significantly. Furthermore, FIG. 7 illustrates that the flange 88 of the second crimping member 86 extends radially into the forward portion 76 of the second strain relief member 72. This positioning of the flange 88 strengthens the connection between the headset 14 and the cord assembly 10 by further preventing the forward portion 76 from pulling through the corresponding opening in the headset housing. The cord assembly 10 and connecting assembly 26 are therefore assembled in an efficient and repeatable manner compared to conventional cord assemblies.

Figure 7A:
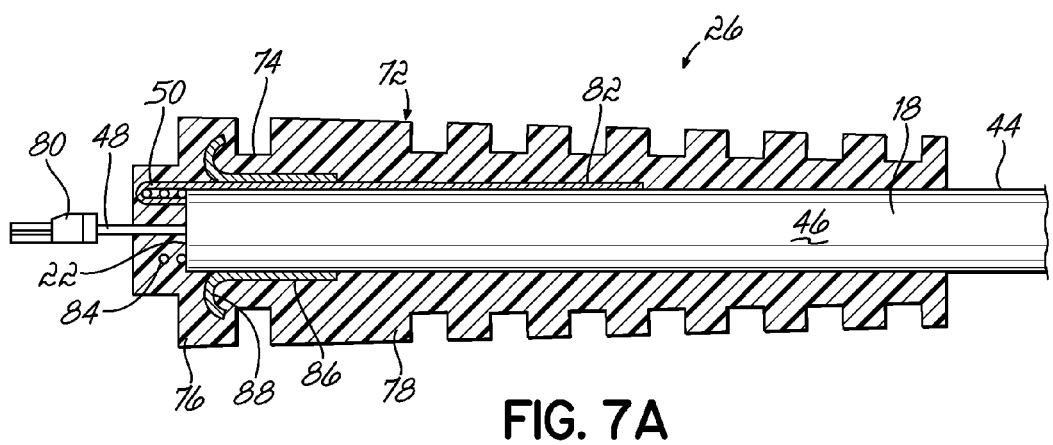
FIG. 7A is a cross-sectional side view of the strain relief and alternative embodiment of the second end of the cord of FIG. 6A.

Alternatively as shown in FIG. 7A, the second end 22 of the cord 18 may include the second tensioning member 84. The second tensioning member 84 or second coil spring 84 is positioned to engage the insulation layer 44 at the second end 22 such that the electrical conductors 48 and the strength member 50 extend through the interior of the second coil spring 84. The second end 82 of the strength member 50 is reversed and pulled back along the cord 18, partially compressing the second coil spring 84 to tension the strength member 50. The second crimping member 86 then secures the strength member 50 and ensures that the desired pre-tension force is maintained in the strength member 50. As shown in FIG. 7A, the second strain relief member 72 is molded over the strength member 50, second crimping member 86, and second coil spring 84 to further ensure that the second crimping member 86 maintains the desired pre-tension force in the strength member 50

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A cord assembly for an electronic device, comprising:
a cord including an insulation layer having a first end with an exterior surface and at least one electrical conductor extending within the insulation layer;
a strength member extending within the insulation layer generally alongside of the at least one conductor and including a first end extending beyond the insulation layer first end, the strength member first end further extending back along the exterior surface of the insulation layer under a pre-tension force;
a securing element configured to crimp on to the strength member and insulation layer and lock the pre-tensioned first end of the strength member with the first end of the insulation layer; and
a molded member secured to the cord at the first end of the insulation layer, a portion of the molded member being molded over the first end of the strength member and the securing element;
wherein the strength member is pre-tensioned such that any additional tensile loads placed on the cord are carried at least initially by the strength member.

2. The cord assembly of claim 1, wherein the strength member includes a Kevlar strand.

3. The cord assembly of claim 1, wherein the securing element includes a flange, the flange extending radially outwardly from the cord and held within the molded member.

4. The cord assembly of claim 3, wherein the molded member is a strain relief member and includes a connecting notch dividing the molded strain relief member into forward and rear portions and adapted to mate with a rigid housing of a peripheral device.

5. The cord assembly of claim 4, wherein the flange of the crimping member is disposed within the forward portion of the strain relief member so as to be positioned within the rigid housing to strengthen the connection between the peripheral device and the cord assembly.

6. The cord assembly of claim 1, further comprising:
a pre-tensioning element engaging the first end of the strength member to pre-tension the strength member, wherein a portion of the molded member is molded over the pre-tensioning element.

7. The cord assembly of claim 6, wherein the pre-tensioning element is a coil spring, and the first end of the strength member engages the coil spring to compress the spring, which results in pre-tensioning of the strength member.

8. The cord assembly of claim 7, wherein the coil spring abuts the first end of the insulation layer, the coil spring being compressed between the insulation layer and the first end of the strength member.

9. The cord assembly of claim 1, wherein the insulation layer of the cord includes a second end with a second exterior surface, the strength member includes a second end extending beyond the second end of the insulation layer, and the assembly further comprises:
a second securing element to couple the second end of the strength member with the second end of the insulation layer at the second exterior surface.

10. The cord assembly of claim 9, wherein the second securing element includes a crimping member configured to be crimped around the second end of the strength member and the insulation layer to maintain pre-tension on the strength member.

11. The cord assembly of claim 1, further comprising:
a connector configured to couple with the electronic device, the connector including a connector housing with front and rear ends, a contact plate attached to the front end of the connector housing, and the molded member is a pre-mold member molded over an end of the strength member and the securing element;
wherein the pre-mold member receives the at least one conductor between the contact plate and the cord.

12. The cord assembly of claim 11, further comprising:
a strain relief member molded at least partially between the connector housing and the pre-mold member, the strain relief member extending beyond the rear end of the connector housing.

13. The cord assembly of claim 11, wherein the connector housing further includes engagement members configured to couple the connector to the electronic device, the engagement members being adapted to break away from the electronic device before a tensile load on the cord is carried by the at least one conductor or the insulation layer.

14. The cord assembly of claim 11, further comprising:
a pre-tensioning element engaging the end of the strength member to pre-tension the strength member, wherein a portion of the pre-mold member is molded over the pre-tensioning element.

15. A cord assembly comprising:
a cord having at least one electrical conductor extending in an insulation layer having an end;
a strength member extending in the insulation layer generally alongside of the conductor;
an end of the strength member extending out of the end of the insulation layer and extending back along an external surface of the insulation layer under a pre-tension force;
a securing element configured to crimp on to the strength member and insulation layer and lock the pre-tensioned end of the strength member with the insulation layer to maintain pre-tension on the strength member;
a plug member secured at the end of the cord, a molded member of the plug member being molded over the end of the strength member and the securing element.

16. The cord assembly of claim 15 wherein the strength member is a Kevlar strand.

17. The cord assembly of claim 15 further comprising a tensioning element, the end of the strength member engaging the tensioning element to create a pre-tension force on the tensioning element, the molded member of the plug member being molded over the tensioning element and the end of the strength member.

18. The cord assembly of claim 17 wherein the tensioning element is a coil spring, the end of the strength member engaging the coil spring to compress the spring for creating the pre-tension force.

* * * * *